Figure 1:
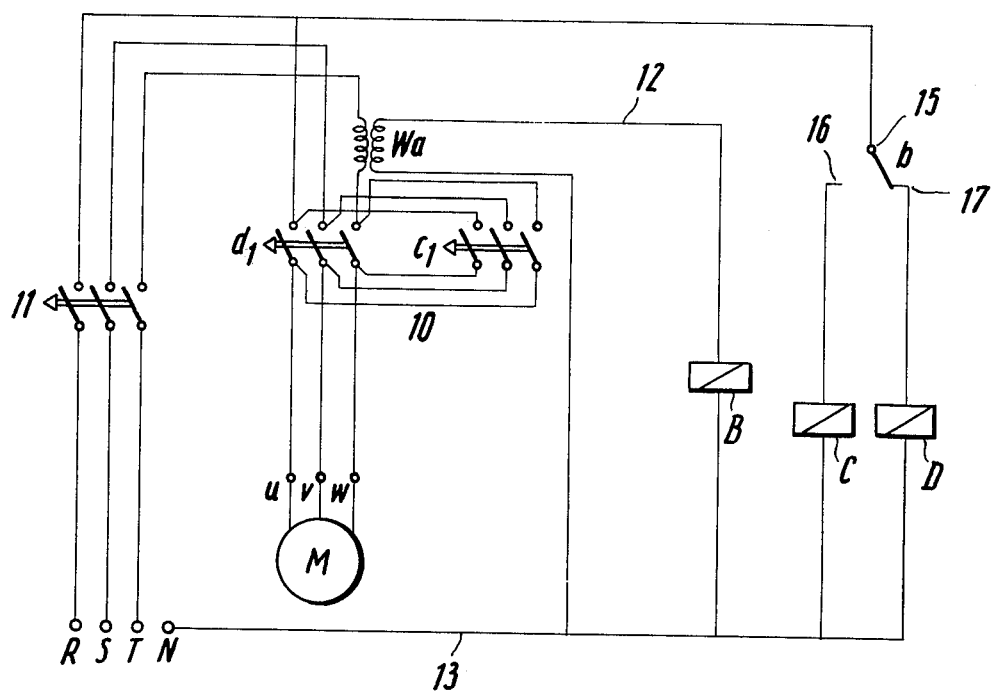

United States Patent [19]

Brehm

[11] 4,243,920
[45] Jan. 6, 1981

[54] CONTROL DEVICE FOR MONITORING MACHINES DRIVING REVOLVING DEVICES AND METHOD FOR OPERATING THE DEVICE

[76] Inventor: Emil Brehm, Am Nussbaum 16, 6710 Frankenthal 5, Fed. Rep. of Germany

[21] Appl. No.: 928,531

[22] Filed: Jul. 27, 1978

[30] Foreign Application Priority Data

Sep. 20, 1977 [DE] Fed. Rep. of Germany ....... 2742216

[51] Int. Cl.³ .............................................. H02P 1/40
[52] U.S. Cl. .................... 318/285; 318/289; 318/284; 318/739
[58] Field of Search ............... 318/430, 434, 284, 285, 318/447, 474, 476, 477, 739, 756, 283, 289, 755, 754, 281

[56] References Cited

U.S. PATENT DOCUMENTS

| 2,978,965 | 4/1961 | Armitage et al. | 318/434 |
| 3,008,074 | 11/1961 | Gregory | 318/284 |
| 3,090,900 | 4/1963 | Porter et al. | 318/283 |
| 3,181,047 | 4/1965 | Simon | 318/289 |
| 3,551,749 | 12/1970 | Hore | 318/754 |
| 3,713,005 | 1/1973 | Engel | 361/96 |
| 3,886,407 | 5/1975 | Anderson | 318/754 |

FOREIGN PATENT DOCUMENTS 2247167 3/1974 Fed. Rep. of Germany ........... 318/284

Primary Examiner—J. V. Truhe
Assistant Examiner—John W. Redman
Attorney, Agent, or Firm—Herbert L. Lerner

[57] ABSTRACT

Control device responding to current changes in a load circuit including a supervisory circuit carrying a current proportional to the current in the load circuit, a transformer coupling the supervisory circuit to the load circuit, and an overcurrent sensor and an overcurrent relay electrically connected in series in the supervisory circuit. The overcurrent sensor being set to deliver a signal when a given first current value is reached after a response delay, the overcurrent relay being able to interrupt the load circuit if a given second current value is reached after an adjustable response delay, and a method of operating the control device in a waste crushing machine.

7 Claims, 2 Drawing Figures

CONTROL DEVICE FOR MONITORING MACHINES DRIVING REVOLVING DEVICES AND METHOD FOR OPERATING THE DEVICE

The invention relates to an electrical control device responding to current changes in a load circuit, especially for monitoring machines which drive revolving devices, the rotation of which can be blocked by objects in an undesired manner, and comprising at least one measuring sensor which can be set to a response current value.

The use of measuring sensors for protecting circuits in case of overload or short circuit is known. However, the amount of electronic and/or electromagnetic components required in such circuits is considerable. If thermal measuring sensors are used, considerable dead times frequently result, so that fast interruption in the event of an overcurrent or short circuit is not possible.

The known control devices of this type are very elaborately equipped and even then do not fully meet the specified requirements, particularly if they are to be used for monitoring machines which drive rotating machines, for instance, waste crushing machines or conveyer belts for transporting packages or the like. For this reason, the known control devices have expensive programming mechanisms and extensive time measuring and counting devices. Even so, it was often not possible to program these conventional control devices so that all types of operational disturbances that occur, could be recognized and corrected.

It is therefore an object of the present invention to provide an electrical control device responding to current changes in a load circuit, which overcomes the hereinaforementioned shortcomings of heretofore known devices of this general type, and which does so in such a manner so as to meet the stated requirements with a lesser amount of switching means and be able to be employed in a wider field of applications.

With the foregoing and other objects in view, there is provided in accordance with the invention, a control device responding to current changes in a load circuit, comprising a supervisory circuit carrying a current proportional to the current in the load circuit, means for coupling the supervisory circuit to the load circuit and an overcurrent sensor and an overcurrent relay electrically connected in series in the supervisory circuit, the overcurrent sensor being set to deliver a signal when a given first current value is reached after a response delay, the overcurrent relay having means for interrupting the load circuit if a given second current value is reached after an adjustable response delay.

The signal delivered by the overcurrent sensor can be utilized in various ways. It can serve as an alarm signal or set in operation a measuring or counting device. It can perform switching operations in the load circuit or in equipment which is connected into the load circuit.

In accordance with another feature of the invention, the second current value is greater than the first current value and the response delay of the overcurrent sensor is longer than that of the overcurrent relay.

In accordance with a further feature of the invention, the coupler means is a transformer. This is particularly advantageous if large currents flow in the load circuit.

A particularly practical application of the control device according to the invention is the monitoring of a waste crushing machine. In such machines, it is important that the machine is reversed automatically if it is overloaded when the material thrown-in is crushed. Be reversing the drive motor, the blade cylinders can usually free themselves quickly of materials which had led to jamming, wedging or clogging of the blade cylinders. If the blade cylinders are completely blocked by metallic objects, for instance, then the machine is to be disconnected completely as protection against overload.

In accordance with the method of the invention, there is provided a method of operating a control device in a waste crushing machine having a drive motor operable in forward and reverse rotation, which comprises switching the drive motor from forward to reverse rotation through the actuation of a second overcurrent relay of a pair of overcurrent relays connected in series in a supervisory circuit coupled to the load circuit of the motor, after a disconnect pause when a given first current value is reached, and switching the drive motor to forward rotation after a predetermined duration of reverse rotation and another disconnect pause.

In accordance with another mode of the invention, switching from forward to reverse and from reverse to forward rotation is controlled by a current pulse relay having a pair of double-throw contacts, the disconnect pause corresponding to the fall-back time of the second overcurrent relay and the predetermined duration of reverse rotation is determined by a first time delay relay which simulates an overcurrent at the second overcurrent relay at the end of the time delay.

By setting the first time delay relay accordingly, the duration of the reverse rotation of the drive motor can thus be predetermined exactly.

In accordance with an additional mode of the invention, both overcurrent relays have a response delay which is longer than the duration of the switching-on transient current of the drive motor.

In accordance with an added mode of the invention, there is provided a second time delay relay which begins excitation when the drive motor is switched on and has a set response time which is longer than the predetermined duration of reverse rotation, after which the second time delay relay delivers a signal to switch the drive motor off, and including a third time delay relay which is activated at the start of forward rotation of the drive motor and has a set response time which is shorter than that of the second time delay relay, after which the third time delay relay delivers a signal to de-activate the second time delay relay.

In accordance with a further mode of the invention, the set response time of the second time delay relay is more than five times the predetermined duration of reverse duration, and the set response time of the third time delay relay, corresponds to the predetermined duration of reverse rotation.

In accordance with a concomitant mode of the invention, there is provided a time delay switch operable to selectively switch the drive motor off after an adjustable length of time and to switch the drive motor into reverse rotation after an adjustable length of uninterrupted forward rotation time.

Other features which are considered as characteristic for the invention are set forth in the appended claims.

Although the invention is illustrated and described herein as embodied in control device for monitoring machines driving revolving devices and method for operating the device, it is nevertheless not intended to be limited to the details shown, since various modification and structural changes may be made therein without departing from the spirit of the invention and within the scope and range of equivalents of the claims.

Figure 2:
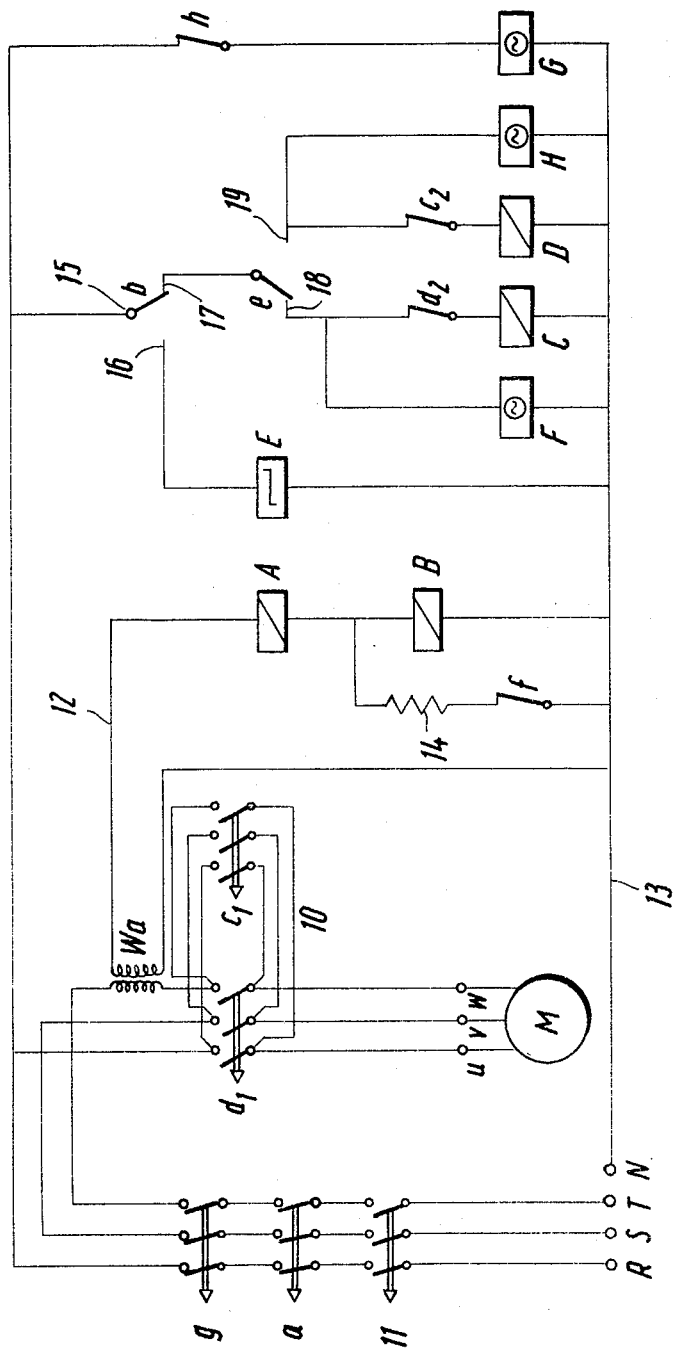

The construction and method of operation of the invention, however, together with additional objects and advantages thereof will be best understood from the following description of specific embodiments when read in connection with the accompanying drawing in which:

FIGS. 1 and 2 are circuit diagrams of the control device according to the invention.

Referring now jointly to the figures of the drawing, it will become apparent that FIG. 1 shows a simplified embodiment and FIG. 2 shows a more complicated embodiment including the elements of FIG. 1 and additional control relays. In the figures, there is seen the motor M of a waste crushing machine. The terminals U, V and W of the motor M are connected to the phases R, S and T of a three-phase network through a reversing switch 10, a contactor 11, a set of break contacts a of an overcurrent relay A and a set of break contacts g of a second time delay relay G. The primary winding of a current transformer Wa is connected into the lead of the terminal W of the motor M. The supervisory circuit 12 is taken from the secondary winding of the transformer Wa. One of the taps of the secondary winding is connected to a grounded neutral conductor 13, which leads to a neutral conductor terminal N. In the supervisory circuit 12, the overcurrent relay A and a second overcurrent sensor in the form of a relay B are connected in series, the second overcurrent relay B being shunted by a resistor 14 and a break contact f of a first time delay relay F.

In a switching circuit between the R-phase and the neutral conductor 13, a pair of double-throw contacts b of the second overcurrent relay B are disposed. In this way, the movable contact 15 is connected to the R-phase and the one fixed contact 16 to the neutral conductor 13 through a current pulse relay E. The other fixed contact 17 is connected through a pair of double throw contacts e of the current pulse relay E to the neutral conductor 13 through a switching relay or contactor C in one position of the pair of double-throw contacts e, and through a switching relay or contactor D in the other position. The two switching relays C and D are parts of the reversing switch 10, in which the set of contacts $c_1$ is associated with the contactor C and the set of contacts $d_1$ with the contactor D. In the lead to the switching relay C is disposed a break contact $d_2$ of the switching relay D and in the lead to the switching relay D, a break contact $c_2$ of the switching relay C. To the fixed contact 18 connected to the switching relay C of the pair of double-throw contacts e is further connected the first time delay relay F. To the fixed contact 19 connected to the switching relay D, a third time delay relay H is further connected. The second leads of both time delay relays F and H are connected to the neutral conductor 13. Finally, one of the leads of a second time delay relay G is connected to the neutral conductor 13 and the other lead to the E-phase through a break contact h of the third time delay relay H.

The set of contacts $d_1$ in the reversing switch 10 switches the motor M to forward rotation, and the set of contacts $c_1$ into reverse. Therefore, if the pairs of double-throw contacts b and e are in the position shown in the drawing, the motor M runs in the reverse direction. The control device for monitoring the waste crushing machine according to the invention operates as follows:

After the contactor 11 is closed, the motor M starts in reverse. This is advisable for reasons of accident prevention, because in this way, an operator's hand is not drawn into the crushing machine by the blade cylinders. At the same time, there is a voltage at the first time delay relay F which is set so that it responds after about two seconds. The break contact f opens in the process, so that the current flowing through the second overcurrent relay B increases suddenly. The resistor 14 is matched to the resistance of the exciter coil of the second overcurrent relay B in such a manner that the sudden current rise is so large when the break contact f is opened, that the second overcurrent relay B responds. Thereby, the double-throw switch b is switched and connects the contacts 15 and 16, so that the current pulse relay E is energized and the double-throw switch e of the latter is switched into its other switch position.

When the double-throw switch b is switched, the current through the switching relay C and the first time delay relay F becomes zero and their contacts drop into the starting position. The motor M stops. The second overcurrent relay B has a fall-back time of about two seconds. During this time, the motor M is therefore standing still. At the end of this time, the double-throw switch b drops back into its starting position, in which the contacts 15 and 17 are connected together. However, now the movable contact of the double-throw switch e is connected to the fixed contact 19 so that the switching relay D and the third time delay relay H are energized. The switching relay D switches the motor M to forward rotation, through its set of contacts $d_1$. The control device remains in this switching position until the current, through an overload of the motor M which may, for instance, be due to hard-to-crush material between the blade cylinders driven by the motor, has risen so much in the supervisory circuit 12 that the second overcurrent relay B responds and the cycle described above is repeated. The motor M is therefore stopped and is switched into reverse rotation for a predetermined duration set at the first time delay relay F, after a pause determined by the fall-back time of the second overcurrent relay B.

If, however, the blade cylinders of the waste crushing machine are suddenly blocked by a hard object e.g. a piece of metal, then the current in the supervisory circuit 12 rises so much in a short time that the first overcurrent relay A responds. While the response current value of this first overcurrent relay A is larger than that of the second overcurrent relay B, the response delay of the first overcurrent relay A is shorter than that of the second overcurrent relay B and is chosen so that the first overcurrent relay A responds before the second overcurrent relay B does, if the motor M is braked suddenly and completely. When the first overcurrent relay A responds, the set of break contacts a in the three-phase line to the motor M is opened and this thereby disconnects the motor. It must then be switched on again by hand by means of the contactor 11 after the obstacle between the blade cylinders is removed.

The response delays of the two overcurrent relays A and B are, of course, chosen so that they are longer than the duration of the closing current transient of the motor M, so that the current peak upon switching the motor on for the first time and during the subsequent reversing processes does not make the control device respond.

If the motor M reverses without interruption, it must be assumed that there are objects between the blade cylinders which cannot be cominuted by the blades. This should cause the machine to be switched off. The time delay relays G and H serve to ascertain this operating condition. The response time of the second time delay relay G is set, for instance, to 14 sec. and that of the third time delay relay H to 2 sec. The time delay relay G is energized when the machine is switched on. If the machine is switched to forward rotation, then the time delay relay H is also energized. If the motor M is not overloaded immediately i.e. if it runs forward at least 2 seconds, the time delay relay H runs down and the break contact h opens so that the time delay relay G is de-energized. If, however, the time delay relay H is prevented from running down because the motor M is continuously switched into reverse, then the time delay relay G can run down after the set time of 14 seconds, so that the set of break contacts g in the 3-phase line to the motor M is opened and the machine is shut down. Then, it must be set in operation again by hand by the contactor 11. By suitable setting of the response time of the second time delay relay G, it can therefore be determined after how many uninterrupted and unsuccessful reversals of the motor M the machine is to be switched off.

In some cases, it may be advantageous to additionally provide a time delay switch (not illustrated) which either disconnects the drive motor M selectably after an adjustable time or switches the motor into reverse after an adjustable time if it runs forward uninterrupted. This purpose can be served, for instance, by a further time delay relay which is switched into the switching circuit of the control device through a multi-pole double-throw switch in either mode of operation.

In the form described in the embodiment example, the control device according to the invention can also be used, for instance, for monitoring the load circuit of a conveyer belt for transporting packages or the like. If a package, for instance, develops increased friction resistance with the conveyer belt, due to jamming at the lateral guide rails, then the drive motor of the conveyer belt is reversed so that the package, traveling backwards, can disengage from the jammed condition. However, if a package blocks the conveyer belt, then the drive motor of the conveyer belt is switched off.

Other applications of the control device according to the invention, relate to current monitoring in switching circuits, a warning signal being switched on when the second overcurrent relay B responds, while the switching circuit to be monitored is disconnected from the voltage source when the first overcurrent relay A responds. However, the application of the control device according to the invention is by no means limited to the examples described herein.

There are claimed:

1. Method of operating a control device in a waste crushing machine, which comprises switching a drive motor from forward to reverse rotation by actuating a second overcurrent relay of a pair of overcurrent relays connected in series in a supervisory circuit coupled to the load circuit of the motor, after pausing to disconnect the motor from its source when a given first current value is reached, and switching the drive motor to forward rotation after a predetermined duration of reverse rotation and again pausing to disconnect.

2. Method according to claim 1, which comprises controlling switching from forward to reverse and from reverse to forward rotation by a current pulse relay having a pair of double-throw contacts, adjusting the disconnect pauses to the fall-back time of the second overcurrent relay, and determining the predetermined duration of reverse rotation by a first time delay relay simulating an overcurrent at the second overcurrent relay at the end of the time delay.

3. Method according to claim 1 which comprises setting both overcurrent relays to a response delay which is longer than the duration of the switching-on transient current of the drive motor.

4. Method according to claim 2 which comprises beginning excitation of a second time delay relay when the drive motor is switched on, setting a response time therein which is longer than the predetermined duration of reverse rotation, subsequently delivering a signal with the second time delay relay to switch the drive motor off, activating a third time delay relay at the start of forward rotation of the drive motor, setting a response time therein which is shorter than that of the second time delay relay, and subsequently delivering a signal with the third time delay relay to de-activate the second time delay relay.

5. Method according to claim 4 which comprises setting the response time of the second time delay relay to more than five times the predetermined duration of reverse duration, and setting the response time of the third time delay relay to the predetermined duration of reverse rotation.

6. Method according to claim 1, which comprises selectably switching the drive motor off after an adjustable length of time and switching the drive motor into reverse rotation after an adjustable length of uninterrupted forward rotation time with a time delay switch.

7. Method according to claim 1, which comprises adjustably delaying disconnection of the motor if a second current value which is greater than the first current value is reached.

* * * * *